(12) United States Patent
Fujimoto et al.

(10) Patent No.: US 8,248,735 B2
(45) Date of Patent: Aug. 21, 2012

(54) MAGNETIC HEAD SUSPENSION FOR SUPPORTING PIEZOELECTRIC ELEMENTS IN A NON-FACING MANNER RELATIVE TO SUSPENSION STRUCTURE

(75) Inventors: Yasuo Fujimoto, Kyoto-fu (JP); Satoru Takasugi, Kyoto-fu (JP); Kenji Mashimo, Kyoto-fu (JP)

(73) Assignee: Suncall Corporation, Kyoto-fu (JP)

( * ) Notice: Subject to any disclaimer, the term of this patent is extended or adjusted under 35 U.S.C. 154(b) by 48 days.

(21) Appl. No.: 12/870,375

(22) Filed: Aug. 27, 2010

(65) Prior Publication Data

US 2011/0058282 A1  Mar. 10, 2011

(30) Foreign Application Priority Data

Sep. 4, 2009 (JP) ................. 2009-204350

(51) Int. Cl.
*G11B 5/56* (2006.01)
(52) U.S. Cl. .................................... 360/294.4
(58) Field of Classification Search ............... 360/294.4
See application file for complete search history.

(56) References Cited

U.S. PATENT DOCUMENTS

| 6,661,618 | B2 * | 12/2003 | Fujiwara et al. | 360/294.4 |
| 7,167,344 | B2 * | 1/2007 | Nakagawa et al. | 360/294.4 |
| 7,280,319 | B1 * | 10/2007 | McNab | 360/294.4 |

FOREIGN PATENT DOCUMENTS

| JP | 2002-050140 | 2/2002 |
| JP | 2002-251854 | 9/2002 |
| JP | 2009-080915 | 4/2009 |

* cited by examiner

*Primary Examiner* — Allen Heinz
(74) *Attorney, Agent, or Firm* — Sterne, Kessler, Goldstein & Fox PLLC

(57) ABSTRACT

In a magnetic head suspension, a piezoelectric element is disposed within a supporting part's open section so that at least a part of its distal-side end surface faces a distal-side wall surface of the supporting part's distal end section forming a distal-side gap between the distal-side end surface and the distal-side wall surface and at least a part of its proximal-side end surface faces a proximal-side wall surface of the supporting part's proximal end section forming a proximal-side gap between the proximal-side end surface and the proximal-side wall surface in a state where the piezoelectric element's upper and lower electrode layers do not face the supporting part and any rigid members that are fixed to the supporting part. The piezoelectric element is fixed to the supporting part by a distal-side insulative adhesive agent and a proximal-side insulative adhesive agent.

7 Claims, 15 Drawing Sheets

MAGNETIC HEAD SUSPENSION FOR SUPPORTING PIEZOELECTRIC ELEMENTS IN A NON-FACING MANNER RELATIVE TO SUSPENSION STRUCTURE

BACKGROUND OF THE INVENTION

1. Field of the Invention

The present invention relates to a magnetic head suspension for supporting a magnetic head slider that reads and/or writes data from and to a recording medium such as a hard disk drive.

2. Related Art

Increase in capacity of a magnetic disk device requires improvement in accuracy for positioning a magnetic head slider on a target track. In this regard, there has been proposed a magnetic head suspension that includes paired piezoelectric elements functioning as a sub actuator and enables micro motion of the magnetic head slider in a seek direction by the paired piezoelectric elements in addition to coarse motion of the magnetic head slider in the seek direction by a main actuator such as a voice coil motor (for example, see Japanese Unexamined Patent Application Publication Nos. 2002-251854, 2009-080915 and 2002-050140, which are hereinafter referred to as prior art documents 1-3, respectively).

More specifically, the magnetic head suspension includes a load bending part that generates a load for pressing the magnetic head slider toward a disk surface, a load beam part that transmits the load to the magnetic head slider, a supporting part that supports the load beam part via the load bending part and is swung about a swing center directly or indirectly by the main actuator, a flexure part that is supported by the load beam part and the supporting part while supporting the magnetic head slider, and the paired piezoelectric elements that is attached to the supporting part.

The supporting part is provided with a proximal end section that is connected directly or indirectly to the main actuator, a distal end section to which the load bending part is connected, an open section that is positioned between the proximal end section and the distal end section in a suspension longitudinal direction, and paired right and left connecting beams that are positioned on both sides of the open section in a suspension width direction and connect the proximal end section and the distal end section.

Each of the paired piezoelectric elements has a piezoelectric main body and paired electrode layers disposed on both sides of the piezoelectric main body in a thickness direction thereof, and expands and contracts in a direction perpendicular to the thickness direction in accordance with application of a predetermined voltage between the paired electrode layers.

In the magnetic head suspension, the paired piezoelectric elements have distal end portions and proximal end portions that are respectively fixed to the distal end section and the proximal end section in a state that they are symmetrical with each other with respect to a suspension longitudinal center line and have expansion and contraction directions different from each other.

In the thus configured magnetic head suspension, the distal end section can be swung in the seek direction with respect to the proximal end section while the paired connecting beams being elastically deformed in accordance with expanding movement of one of the paired piezoelectric elements and contracting movement of the other one of the paired piezoelectric elements. Consequently, the micro motion in the seek direction of the magnetic head slider, which is supported by the distal end section through the load bending part, the load beam part and the flexure part, can be performed.

However, each of the magnetic head suspensions disclosed in the prior art documents 1-3 has a problem that the paired piezoelectric elements are likely to be deformed in a bending manner in the thickness direction when being expanded and contracted.

If the paired piezoelectric elements are deformed in a bending manner upon the expansion and contraction thereof, the distal end section is twisted with respect to the proximal end section. As a result, floating movement of the magnetic head slider is become unstable when it is moved in the seek direction.

First, the problem will be explained in detail in case of the magnetic head suspensions disclosed in the prior art documents 1 and 2.

In each of the magnetic head suspensions disclosed in the prior art documents 1 and 2, the distal end section of the supporting part is formed with a distal-end-side cutaway portion that is opened in the upward direction as well as in a direction towards the open section, and the proximal end section is formed with a proximal-end-side cutaway portion that is opened in the upward direction as well as in a direction towards the open section.

The distal-end-side cutaway portion includes a distal-end-side vertical surface that faces towards the proximal side in the suspension longitudinal direction and a distal-end-side horizontal surface that extends from a lower edge of the distal-end-side vertical surface towards the proximal side in the suspension longitudinal direction to be opened into the open section.

The proximal-end-side cutaway portion includes a proximal-end-side vertical surface that faces towards the distal side in the suspension longitudinal direction and a proximal-end-side horizontal surface that extends from a lower edge of the proximal-end-side vertical surface towards the distal side in the suspension longitudinal direction to be opened into the open section.

Each of the paired piezoelectric elements is fixed to the supporting part by insulative adhesive agents that are disposed between its distal-side end surface and the distal-end-side vertical surface, between a distal side of a lower electrode layer that is positioned on the lower side and the distal-end-side horizontal surface, between its proximal-side end surface and the proximal-end-side vertical surface, and between a proximal side of the lower electrode layer and the proximal-end-side horizontal surface, respectively.

That is, in each of the magnetic head suspensions disclosed in the prior art documents 1 and 2, the lower electrode layer of each of the paired piezoelectric elements has the distal side and the proximal side that are fixed to and retained by the distal-end-side horizontal surface and the proximal-end-side horizontal surface with the insulative adhesive agents, respectively, in a state where the distal side and the proximal side face the distal-end-side horizontal surface and the proximal-end-side horizontal surface, respectively. On the other hand, an upper electrode layer of the each of the paired piezoelectric elements that is positioned on the upper side (on the side opposite to the disk surface) is in a substantial free state with respect to the supporting part.

Accordingly, when the piezoelectric element is expanded or contracted in the suspension longitudinal direction upon application of the predetermined voltage between the paired electrode layers (the upper and lower electrode layers) of the piezoelectric element, the lower electrode layer whose distal side and proximal side are faced and fixed to the distal-end-side horizontal surface and the proximal-end-side horizontal surface respectively is restricted in the expansion and contraction movement while the upper electrode layer can be expanded or contracted freely.

As a result, the piezoelectric element is deformed in a bending manner in the direction orthogonal to the disk surface when being expanded or contracted, whereby floating movement of the magnetic head slider is become unstable when it is moved in the seek direction by the piezoelectric elements.

Next, the problem will be explained in detail in case of the magnetic head suspension disclosed in the prior art document 3.

In the magnetic head suspension disclosed in the prior art document 3, the supporting part is provided with a distal-end-side plate fixed to a lower surface (a surface facing the disk surface) of the distal end section so as to be at least partially positioned within the open section in plan view, and a proximal-end-side plate fixed to a lower surface of the proximal end section so as to be at least partially positioned within the open section in plan view.

Each of the paired piezoelectric elements is fixed to the supporting part by insulative adhesive agents that are disposed between its distal-side end surface and a wall surface of the distal end section, between the distal side of the lower electrode layer and the distal-end-side plate, between its proximal-side end surface and a wall surface of the proximal end section, and between the proximal side of the lower electrode layer and the proximal-end-side plate, respectively.

That is, in the magnetic head suspension disclosed in the prior art document 3, the lower electrode layer has the distal side and the proximal side that are fixed to and retained by the distal-end-side plate and the proximal-end-side plate with the insulative adhesive agents, respectively, in a state where the distal side and the proximal side face the distal-end-side plate and the proximal-end-side plate, respectively. On the other hand, the upper electrode layer is in a substantial free state with respect to the supporting part.

Accordingly, also in the magnetic head suspension disclosed in the prior art document 3 in the same manner as the magnetic head suspensions disclosed in the prior art documents 1 and 2, the piezoelectric elements are deformed in a bending manner in the direction orthogonal to the disk surface when being expanded or contracted, whereby floating movement of the magnetic head slider is become unstable when it is moved in the seek direction by the piezoelectric elements.

SUMMARY OF THE INVENTION

The present invention has been achieved in view of the above conventional art, and it is a object thereof to provide a magnetic head suspension that enables coarse motion of a magnetic head slider by a main actuator as well as micro motion of the magnetic head slider by piezoelectric elements, the magnetic head suspension capable of effectively preventing or reducing a bending deformation of the piezoelectric element in a direction orthogonal to a disk surface when the piezoelectric element is expanded and contracted, thereby stabilizing floating movement of the magnetic head slider at the time of being moved in the seek direction by the piezoelectric elements.

In order to achieve the first object, the present invention provides a magnetic head suspension including a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each other with respect to a suspension longitudinal center line and have expansion and contraction directions different from each other in order to enable micro motion of the magnetic head slider in a seek direction, each of the paired piezoelectric elements including a piezoelectric main body, a lower electrode layer that is disposed on a first side of the piezoelectric main body that faces the disk surface and an upper electrode layer that is disposed on a second side of the piezoelectric main body that is opposite from the disk surface, the magnetic head suspension including a following configuration.

The supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned on both sides of the open section in a suspension width direction and connect the proximal end section and the distal end section.

Each of the paired piezoelectric elements is disposed within the open section so that at least a part of its distal-side end surface faces a distal-side wall surface of the distal end section that faces toward the proximal side in the suspension longitudinal direction with having a distal-side gap between the distal-side end surface and the distal-side wall surface and at least a part of its proximal-side end surface faces a proximal-side wall surface of the proximal end section that faces toward the distal side in the suspension longitudinal direction with having a proximal-side gap between the proximal-side end surface and the proximal-side wall surface in a state where both of the upper and lower electrode layers do not face the supporting part and any rigid members that are fixed to the supporting part. Each of the paired piezoelectric elements is fixed to the supporting part by a distal-side insulative adhesive agent and a proximal-side insulative adhesive agent that fill the distal-side gap and the proximal-side gap, respectively.

The thus configured magnetic head suspension according to the present invention makes it possible to effectively prevent or reduce a bending deformation of the paired piezoelectric elements in a direction orthogonal to the disk surface when the paired piezoelectric elements are expanded and contracted, thereby stabilizing floating movement of the magnetic head slider at the time of being moved in the seek direction by the paired piezoelectric elements.

Preferably, each of the paired piezoelectric elements has an inner side surface and an outer side surface that are covered by an inner-side insulative adhesive agent and an outer-side insulative adhesive agent, respectively.

More preferably, each of the paired connecting beams may include a proximal-side beam that extends substantially linearly from a proximal end connected to the proximal end section to a distal end, and a distal-side beam that extends substantially linearly from a proximal end connected to the proximal-side beam to a distal end connected to the distal end section. The distal-side beam is inclined with respect to the proximal-side beam in a plan view as viewed along a direction orthogonal to the disk surface such that a connection point at which the proximal-side beam and the distal-side beam are connected is located closer to the suspension longitudinal center line relative to a virtual line connecting the proximal end of the proximal-side beam and the distal end of the distal-side beam.

In this case, the outer-side insulative adhesive agent is fixed to at least a part of the corresponding connecting beam, and the inner-side insulative adhesive agent is provided so as to fill whole of a central gap between the paired piezoelectric elements in the suspension width direction.

In any one of the above mentioned various configurations, the flexure part may include a flexure metal base plate fixed to the load beam part and the supporting part by welding, paired right and left reinforcing metal plates that are separate from the flexure metal base plate, an insulating layer laminated on surfaces of the flexure metal base plate and the paired reinforcing metal plates that face the disk surface so as to hold the flexure metal base plate and the paired reinforcing metal plates, and a conductor layer laminated on a surface of the insulating layer that faces the disk surface, each of the paired reinforcing metal plates being disposed so as to at least partially face the lower electrode layer of the corresponding piezoelectric element and be capable of being elastically deformed in the expansion and contraction direction of the piezoelectric element.

In this case, the paired piezoelectric elements are supported by the flexure part through reinforcing insulative adhesive agents applied to the surface of the insulating layer that is opposite from the disk surface so as to enclose the paired reinforcing metal plates, respectively.

Preferably, the flexure part further includes a voltage supply line on the surface of the insulating layer that faces the disk surface, and the voltage supply line is electrically connected to the lower electrode layer by a lower conductive adhesive agent through an opening formed at the insulating layer.

In this case, there is provided an enclosing insulative adhesive agent that encloses the lower conductive adhesive agent in cooperation with the reinforcing insulative adhesive agent. The lower conductive adhesive agent is accommodated in a sealed space enclosed by the lower electrode layer, the insulating layer, the reinforcing insulative adhesive agent and the enclosing insulative adhesive agent.

In any one of the above various configurations, the distal end section is provided with paired distal-side pocket portions at areas thereof that correspond to the paired piezoelectric elements with respect to the suspension width direction, each of the paired distal-side pocket portions being defined by a vertical surface and a horizontal surface, the vertical surface being extended from a surface of the distal end section that is positioned on a first side in a suspension thickness direction toward a second side that is opposite from the first side by a predetermined distance, and the horizontal surface being extended from an end of the vertical surface that is positioned on the second side in the thickness direction to the distal-side wall surface. On the other hand, the proximal end section is provided with paired proximal-side pocket portions at areas thereof that correspond to the paired piezoelectric elements with respect to the suspension width direction, each of the paired proximal-side pocket portions being defined by a vertical surface and a horizontal surface, the vertical surface being extended from a surface of the proximal end section that is positioned on the first side in the suspension thickness direction toward the second side by a predetermined distance, and the horizontal surface being extended from an end of the vertical surface that is positioned on the second side in the thickness direction to the proximal-side wall surface.

Alternatively, the distal end section is provided with paired distal-side pocket portions at areas thereof that correspond to the paired piezoelectric elements with respect to the suspension width direction, each of the paired distal-side pocket portions being defined by a tapered surface extending from the surface of the distal end section that is positioned on a first side in a suspension thickness direction to the distal-side wall surface, the tapered surface being come close to the distal-side wall surface as it goes from the surface on the first side in the thickness direction toward a second side that is opposite from the first side, and reaching the distal-side wall surface at a position away from the surface on the first side toward the second side by a predetermined length. The proximal end section is provided with paired proximal-side pocket portions at areas thereof that correspond to the paired piezoelectric elements with respect to the suspension width direction, each of the paired proximal-side pocket portions being defined by a tapered surface extending from a surface of the proximal end section that is positioned on the first side in the suspension thickness direction to the distal-side wall surface, the tapered surface being come close to the proximal-side wall surface as it goes from the surface on the first side toward the second side, and reaching the proximal-side wall surface at a position away from the surface on the first side toward the second side by a predetermined length.

DETAILED DESCRIPTION OF THE PREFERRED EMBODIMENTS

First Embodiment

Hereinafter, one preferred embodiment of a magnetic head suspension according to the present invention will be described, with reference to the attached drawings.

Figure 1A:
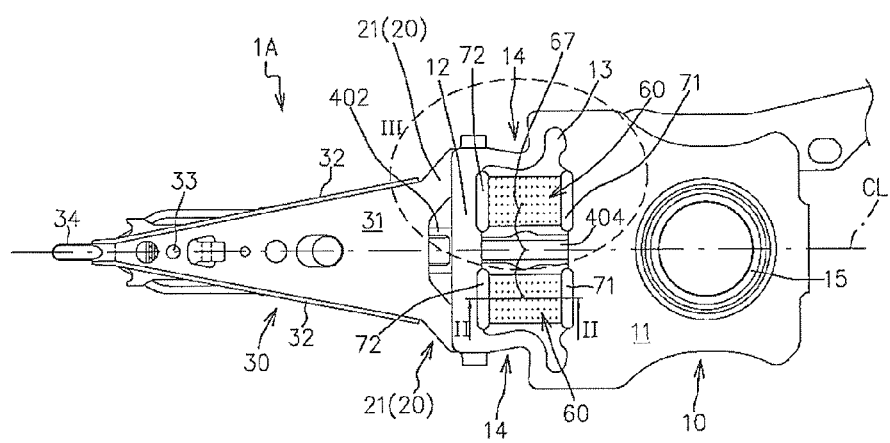
FIGS. 1A and 1B are a top view and a bottom view of a magnetic head suspension according to a first embodiment of the present invention, respectively.
Figure 1B:
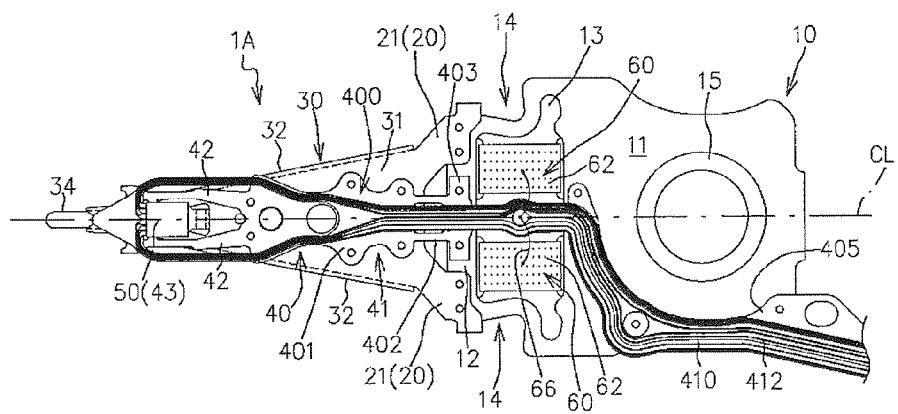

FIGS. 1A and 1B are a top view (a plan view as viewed from a side opposite from a disk surface) and a bottom view (a bottom plan view as viewed from a side close to the disk surface) of a magnetic head suspension 1A according to the present embodiment, respectively. FIG. 1B indicates welding points with using small circles.

Figure 2:
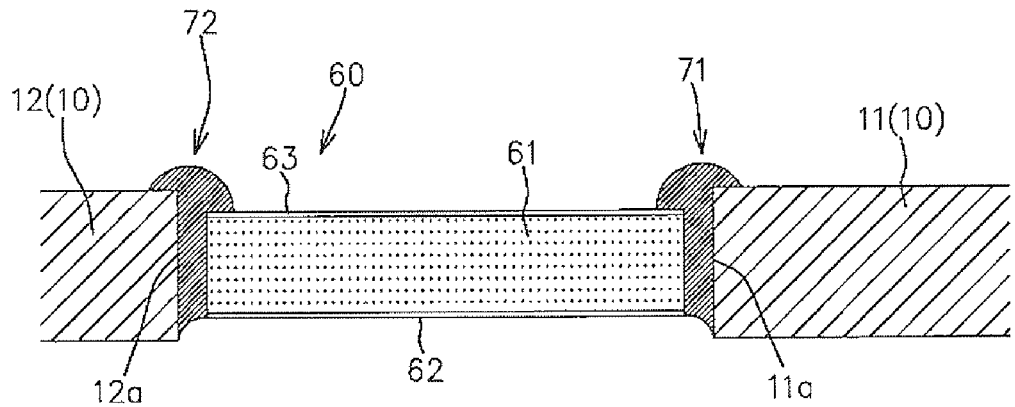
FIG. 2 is a cross sectional view taken along line II-II in FIG. 1A.

FIG. 2 is a cross sectional view taken along line II-II in FIG. 1A.

As shown in FIGS. 1A and 1B, the magnetic head suspension 1A includes a load bending part 20 that generates a load for pressing a magnetic head slider 50 toward a disk surface, a load beam part 30 that transmits the load to the magnetic head slider 50, a supporting part 10 that supports the load beam part 30 via the load bending part 20 and is swung about a swing center in a seek direction parallel to the disk surface directly or indirectly by a main actuator, a flexure part 40 that is supported by the load beam part 30 and the supporting part 10 while supporting the magnetic head slider 50, and paired right and left piezoelectric elements 60 that are attached to the supporting part 10 so as to be symmetrical with each other with respect to a suspension longitudinal center line CL and have expansion and contraction directions different from each other, in order to enable micro motion of the magnetic head slider 50 in the seek direction.

The supporting part 10 is a member for supporting the load beam part 30 through the load bending part 20 while being directly or indirectly connected to the main actuator such as a voice coil motor, and is therefore made to have relatively high rigidity.

In the present embodiment, the supporting part 10 is formed as a base plate including a boss portion 15 to which a distal end of a carriage arm (not shown) is joined by a swage processing, the carriage arm being connected to the main actuator.

The supporting part 10 may be preferably made from, for example, a stainless plate having a thickness of 0.1 mm to 0.8 mm.

As shown in FIGS. 1A and 1B, the supporting part 10 includes a proximal end section 11 that is directly or indirectly connected to the main actuator, a distal end section 12 to which the load bending part 20 is connected, an open section 13 that is positioned between the proximal end section 11 and the distal end section 12 in a suspension longitudinal direction, and paired right and left connecting beams 14 that are positioned on both sides of the open section 13 in a suspension width direction and connect the proximal end section 11 and the distal end section 12, the paired connecting beams being symmetrical to each other with respect to the suspension longitudinal center line CL.

Detailed configuration of the paired connecting beams 14 will be later explained.

As described above, the load beam part 30 is a member for transmitting the load generated by the load bending part 20 to the magnetic head slider 50, and therefore is required to have a predetermined rigidity.

As shown in FIGS. 1A, 1B and 2, in the present embodiment, the load beam part 30 has a plate-like main body portion 31 and flange portions 32 that are formed by being bent in a direction away from the disk surface at both sides of the main body portion 31 in the suspension width direction, and secures the rigidity by the flange portions 32.

The load beam part 30 may be made from, for example, a stainless plate having a thickness of 0.02 mm to 0.1 mm.

Specifically, the load beam part 30 is provided, at its distal end section, with a protrusion 33 that is so-called dimple.

The protrusion 33 is protruded by, for example, about 0.05 mm to 0.1 mm, in a direction toward the disk surface. The protrusion 33 is brought into contact with an upper surface (a surface opposite from the disk surface) of a head-mounting region 43 of the flexure part 40, so that the load is transmitted to the head-mounting region 43 of the flexure part 40 through the protrusion 33.

In the present embodiment, the load beam part 30 further integrally includes a lift tab 34 that extends from a distal end of the main body portion 31 toward a distal end side in the suspension longitudinal direction. The lift tab 34 is a member that engages with a lamp provided in a magnetic disk device so as to cause the magnetic head suspension 50 to be away from the disk surface in z direction (a direction perpendicular to the disk surface) at the time when the magnetic head suspension 1A is swung by the main actuator so that the magnetic head slider 50 is positioned outward the disk surface in a radial direction.

The load bending part 20 has a proximal end connected to the supporting part 10 and a distal end connected to the load beam part 30, and generates the load for pressing the magnetic head suspension 50 toward the disk surface in accordance with its elastic deformation.

As shown in FIGS. 1A, 1B and 2, in the present embodiment, the load bending part 20 includes paired right and left leaf springs 21 that are disposed so that their plate surfaces face the disk surface.

Preferably, the paired leaf springs 21 are elastically bended in such a direction as to cause the magnetic head suspension 50 to be come close to the disk surface before the magnetic head suspension 1A is mounted to the magnetic disk device, and is mounted to the magnetic disk device in a state where the paired leaf springs are elastically bended back so as to generate the pressing load.

The load bending part 20 is made from a stainless steel plate of 0.02 mm to 0.1 mm thick, for example.

In the present embodiment, as shown in FIGS. 1A, 1B and 2, the load bending part 20 is integrally formed with the load beam part 30.

More specifically, the magnetic head suspension 1A according to the present embodiment includes a load beam part/load bending part component that integrally form the load beam part 30 and the load bending part 20. The load beam part/load bending part component 300 is welded to the supporting part 10 in a state where an upper surface of the load beam part component 300 that is poisoned on a side opposite from the disk surface is brought into contact with a lower surface, which faces the disk surface, of the distal end section 12 of the supporting part 10.

The flexure part 40 is fixed to the load beam part 30 and the supporting part 10 while supporting the magnetic head slider 50.

Specifically, the flexure part 40 includes, as shown in FIG. 1B, a body region 41 that is fixed by welding or the like to lower surfaces of the load beam part 30 and the supporting part 10 that faces the disk surface, paired supporting pieces 42 that extends from the body region 41 toward the distal end side, and the head-mounting region 43 that is supported by the supporting pieces 42.

The head-mounting region 43 supports the magnetic head slider 50 at a lower surface that faces the disk surface.

As described above, the protrusion 33 is brought into contact with the upper surface of the head-mounting region 43, so that the head-mounting region 43 could sway flexibly in a roll direction and in a pitch direction, with the protrusion 33 functioning as a fulcrum.

The flexure part 40 has rigidity lower than that of the load beam part 30, so that the head-mounting region 43 could sway in the roll direction and in the pitch direction.

The flexure part 40 may be preferably made from, for example, a stainless plate having a thickness of 0.01 mm to 0.025 mm.

In the present embodiment, the flexure part 40 is provided integrally with a signal wiring structure that is in the form of a printed circuit and transmits a writing signal and/or a reading signal to/from the magnetic head slider 50.

That is, the flexure part 40 has a flexure metal base plate 400 integrally including the body region 41, the supporting pieces 42 and the head-mounting region 43, and a flexure wiring structure 410 laminated on the flexure base plate 400.

The flexure wiring structure 410 may include an insulating layer 411 (see FIG. 3 that is explained later) laminated on a lower surface of the flexure metal base plate 400 that faces the disk surface, a conductor layer 412 laminated on a lower surface of the insulating layer 411 that faces the disk surface, and a cover layer (not shown) enclosing the conductor layer 412.

In the present embodiment, as shown in FIG. 1B, the flexure metal base plate 400 is fixed by welding to the main body portion 31 of the load beam part 30, and the distal end section 12 and the proximal end section 11 of the supporting part 10.

Each of the piezoelectric elements 60 has a piezoelectric main body 61 made of PZT (lead zirconate titanate), a lower electrode layer 62 that is positioned on a lower side of the piezoelectric main body 61 that faces the disk surface, and an upper electrode layer 63 that is positioned on an upper side of the piezoelectric main body 61 that is opposite from the disk surface.

The piezoelectric main body 61 has a thickness of 0.05 mm to 0.3 mm, for example, and the electrode layers are each made of Ag or Au so as to have a thickness from 0.05 µm to several µm.

The paired piezoelectric elements 60 are disposed so as to be symmetrical to each other with the suspension longitudinal center line CL as a reference and have expansion and contraction directions different from each other in a state where their distal end portions and proximal end portions are connected to the distal end section 12 and the proximal end section 11 of the supporting part 10, respectively.

The paired piezoelectric elements 60 are arranged in such a manner as that one of them expands and the other one of them contracts in accordance with application of a predetermined voltage so that the distal end section 12 is moved in the seek direction with respect to the proximal end section 11 to enable micro motion of the magnetic head slider 50 in the seek direction.

In the present embodiment, the upper electrode layer 63 is electrically connected via upper wire bonding 67 to the flexure metal base plate 400 so as to have a ground potential, and the lower electrode layer 62 is electrically connected via lower wire boding 66 to a voltage supply line 413 (see FIG. 6 that is explained later) laminated on the lower surface of the insulating layer 411 that faces the disk surface.

Specifically, as shown in FIGS. 1A and 1B, the body region 41 of the flexure metal base plate 400 includes a load beam part-contact region 401 that is connected to the load bema part 30, a supporting part-distal side-contact region 403 that is connected to the distal end section 12 of the supporting part 10, a supporting part-proximal side-contact region 405 that is connected to the proximal end section 11 of the supporting part 10, a distal-side bridge region 402 that is positioned between the paired leaf springs 21 in the suspension width direction and connects the load beam part-contact region 401 and the supporting part-distal side-contact region 403, and a proximal-side bridge region 404 that passes the open section 13 between the paired piezoelectric elements 60 in the suspension width direction so as to connect the supporting part-distal side-contact region 403 and the supporting part-proximal side-contact region 405.

As shown in FIG. 1A, the upper electrode layer 63 is electrically connected via the upper wire bonding 67 to an upper surface of the proximal-side bridge region 404 that is opposite from the disk surface.

The proximal-side bridge region 404 can also function to improve rigidity of the flexure part 40.

The flexure wiring structure 410 also includes the voltage supply line 413 laminated on the lower surface of the insulating layer 411 that faces the disk surface, and the cover layer is configured to enclose the voltage supply line 413 as well as the conductor layer 412.

In the configuration, the cover layer is formed with an opening that is positioned within the open section 13 in plan view and exposes the voltage supply line 413. The lower wire boding 66 has a first end connected to the voltage supply line 413 through the opening and a second end connected to the lower electrode layer 62.

In the present embodiment, the paired connecting beams 14 has a following structure in order to allow the distal end section 12 to move in the seek direction with respect to the proximal end section 11 without difficulty in response to the expansion and contraction movement of the paired piezoelectric elements 60.

Figure 3:
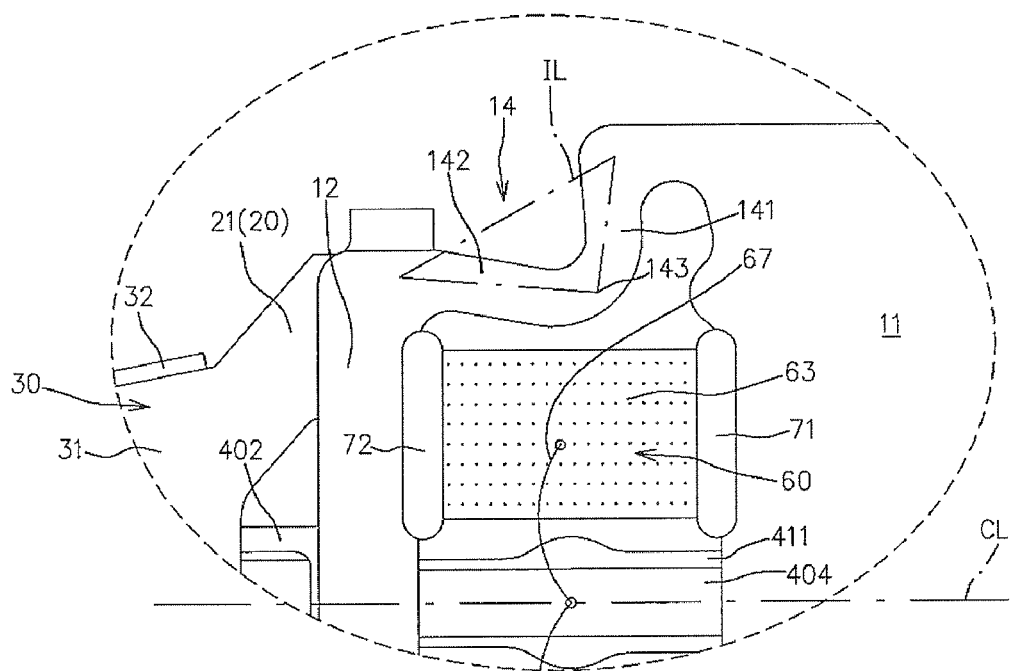
FIG. 3 is an enlarged view of III portion in FIG. 1A.

FIG. 3 is an enlarged view of III portion in FIG. 1A.

Specifically, as shown in FIG. 3, each of the paired connecting beams 14 includes a proximal-side beam 141 that has a proximal end connected to the proximal end section 11 and extends substantially linearly from the proximal end to a distal end, and a distal-side beam 142 that has a proximal end connected to the proximal-side beam 141 and a distal end connected to the distal end section 12 and extends substantially linearly from the proximal end to the distal end.

In each of the paired connecting beams 14, the distal-side beam 142 is inclined with respect to the proximal-side beam 141 in a plan view such that a connection point 143 at which the proximal-side beam 141 and the distal-side beam 142 are connected is located closer to the suspension longitudinal center line CL relative to a virtual line IL connecting the proximal end of the proximal-side beam 141 and the distal end of the distal-side beam 142.

Further, the magnetic head suspension according to the present embodiment has a following configuration in order to effectively prevent or reduce bending deformation of each of the piezoelectric elements 60 in the z direction perpendicular to the disk surface at the time when the piezoelectric elements 60 are expanded and contracted, thereby stabilizing floating movement of the magnetic head slider 50 at the time when the slider 50 is moved in the seek direction by the piezoelectric elements 60.

More specifically, in a first prior art of a magnetic head suspension with piezoelectric elements, a distal end section and a proximal end section of a supporting part are formed with a distal-end-side cutaway portion and a proximal-end-side cutaway portion, respectively.

In the first prior art, a lower electrode layer of the piezoelectric element has a distal side and a proximal side that are fixed by insulative adhesive agents to a horizontal surface of the distal-end-side cutaway portion and a horizontal surface of the proximal-end-side cutaway portion, respectively, while a distal-side end surface and a proximal-side end surface of the piezoelectric element are fixed by insulative adhesive agents to a vertical surface of the distal-end-side cutaway portion and a vertical surface of the proximal-end-side cutaway portion, respectively. On the other hand, an upper electrode layer of the piezoelectric element is in a free state with respect to the supporting part.

In a second prior art of a magnetic head suspension with piezoelectric elements, a distal-end-side plate that has a high rigidity is fixed to a distal end section of a supporting part and a proximal-end-side plate that has a high rigidity is fixed to a proximal end section of the supporting part.

In the second prior art, a lower electrode layer of the piezoelectric element has a distal side and a proximal side that are fixed by insulative adhesive agents to the distal-end-side plate and the proximal-end-side plate, respectively, while a distal-side end surface and a proximal-side end surface of the piezoelectric element are fixed by insulative adhesive agents to a wall surface of the distal end section and a wall surface of the proximal end section, respectively. On the other hand, an upper electrode layer of the piezoelectric element is in a free state with respect to the supporting part.

As described above, in each of the conventional magnetic head suspensions with piezoelectric elements, the distal side and the proximal side of the lower electrode layer are fixed to the supporting part or rigid members fixed to the supporting part so that only the lower electrode layer is restricted in the expansion and contraction movement.

That is, each of the piezoelectric elements is expanded and contracted in a state where the lower electrode layer is fixed at the distal side and the proximal side while the upper electrode layer can be freely expanded and contracted, so that the piezoelectric element is deformed in a bending manner in the direction orthogonal to the disk surface when the piezoelectric element is expanded and contracted. As a result, floating movement of the magnetic head slider is become unstable when it is moved in the seek direction by the piezoelectric elements.

On the other hand, in the magnetic head suspension 1A according to the present embodiment, as shown in FIGS. 1A, 1B and 2, each of the paired piezoelectric elements 60 is disposed within the open section 13 so that at least a part of its distal-side end surface faces a distal-side wall surface of the distal end section 12 that faces towards the proximal side in the suspension longitudinal direction with keeping a distal-side gap between them and at least a part of its proximal-side end surface faces a proximal-side wall surface of the proximal end section 11 that faces towards the distal side in the suspension longitudinal direction with keeping a proximal-side gap between them in a state where both of the upper electrode layer 63 and the lower electrode layer 62 do not face the supporting part 10 and any rigid members fixed to the supporting part 10. Each of the paired piezoelectric elements 60 is fixed to the supporting part 10 by a distal-side insulative adhesive agent 72 and a proximal-side insulative adhesive agent 71 that are filled in the distal-side gap and the proximal-side gap, respectively.

The configuration makes it possible to effectively prevent or reduce the bending deformation of each of the paired piezoelectric elements 60 in the direction orthogonal to the disk surface, the bending deformation being caused at the time when the paired piezoelectric elements are expanded and contracted in the conventional magnetic head suspension with the piezoelectric elements.

Accordingly, the magnetic head suspension according to the present embodiment makes it possible to efficiently move the distal send section 12 in the seek direction by the expansion and contraction movement of the paired piezoelectric elements 60, thereby stabilizing floating movement of the magnetic head slider 50 at the time when the slider 50 is moved in the seek direction by the piezoelectric elements 60.

Further, the magnetic head suspension 1A according to the present embodiment makes it also possible to reduce thickness and weight of the supporting part 10 in comparison with the first prior art.

More specifically, the distal-end-side cutaway portion and the proximal-end-side cutaway portion in the first prior art is required to have such a depth as that most part of the piezoelectric elements are embedded thereinto.

Moreover, in a case where the supporting part is formed as the base plate, the supporting part is required to include the boss portion to which the distal end of the carriage aim is joined by a swage processing.

In this case, it is difficult to form the cutaway portions having such a depth in the member with the boss portion by press working.

In consideration of this point, the supporting part in the first prior art is formed by laminating a first member with the distal-end-side cutaway portion and the proximal-end-side cutaway portion and a second member with the boss portion. Consequently, the first prior art has a problem of increasing thickness and weight of the supporting part.

On the other hand, in the magnetic head suspension 1A according to the present embodiment, the proximal end section 11 with the boss portion 15 could be integrally formed with the distal end section 12, the open section 13 and the paired connecting beams 14 by a single member.

Accordingly, the thickness and the weight of the supporting part 10 could be reduced in comparison with the first prior art.

Described below is one example of manufacturing method of the magnetic head suspension 1A according to the present embodiment.

FIGS. 4A to 4D are process drawings of one example of mounting method of the piezoelectric element 60 to the supporting part 10.

FIGS. 4A to 4D correspond to the cross section taken along line II-II in FIG. 1A.

Figure 4A:
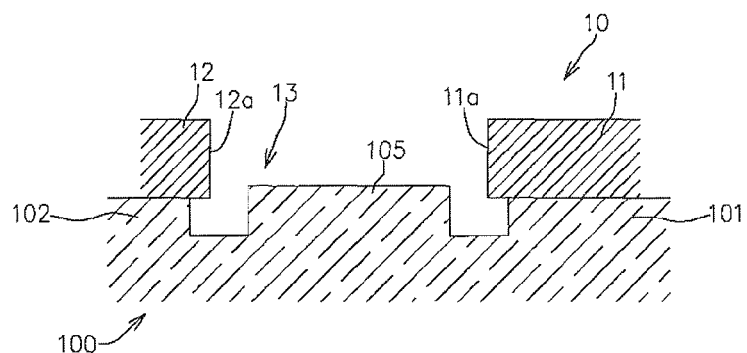
FIGS. 4A to 4D are process drawings of one example of mounting method of a piezoelectric element to a supporting part in the magnetic head suspension according to the first embodiment.

As shown in FIG. 4A, the supporting part 10 is put on a tool 100. The tool 100 includes a distal supporting region 102 and a proximal supporting region 101 that supports the distal end section 12 and the proximal end section 11, respectively, and a piezoelectric element-supporting region 105 which is provided so as to be positioned within the open section 13 and on which the piezoelectric element 60 is put.

More specifically, the distal end section 12 and the proximal end section 11 are put on upper surfaces (mounting surfaces) of the distal supporting region 102 and the proximal supporting region 101, respectively, so that the piezoelectric element-supporting region 105 is positioned within the open region 13.

Figure 4B:
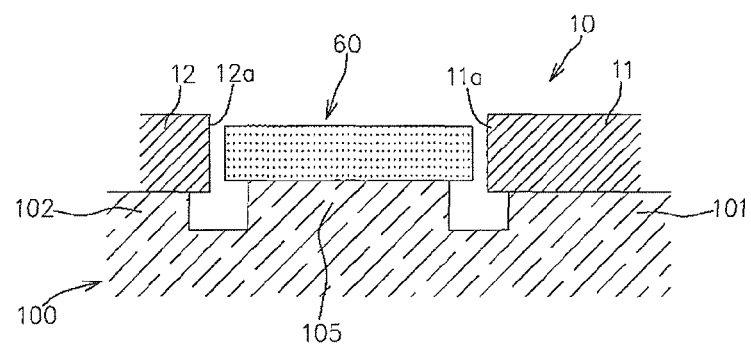
Figure 4C:
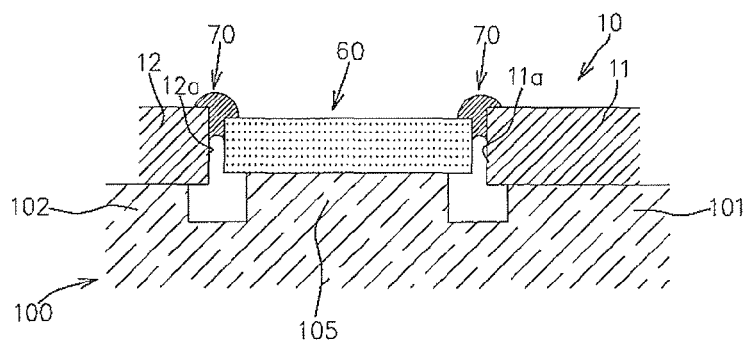

Next, as shown in FIG. 4B, the piezoelectric element 60 is put on an upper surface (mounting surface) of the piezoelectric element-supporting region 105 so that there are provided the distal-side gap between the distal-side end surface and the distal-side wall surface 12a of the distal end section 12 and the proximal-side gap between the proximal-side end surface and the proximal-side wall surface 11 a of the proximal end section 11.

Height of the upper surface (mounting surface) of the piezoelectric element-supporting region 105 relative to the upper surfaces (mounting surfaces) of the distal supporting region 102 and the proximal supporting region 101 may be set in accordance with a position of the piezoelectric element in the thickness direction with respect to the supporting part 10.

There is preferably provided a suction mechanism for fixing the piezoelectric elements and/or the supporting part 10 to the corresponding mounting surfaces by suction power.

Then, hot cured insulative adhesive agents 70 are supplied from above into the distal-side gap and the proximal-side gap.

Figure 4D:
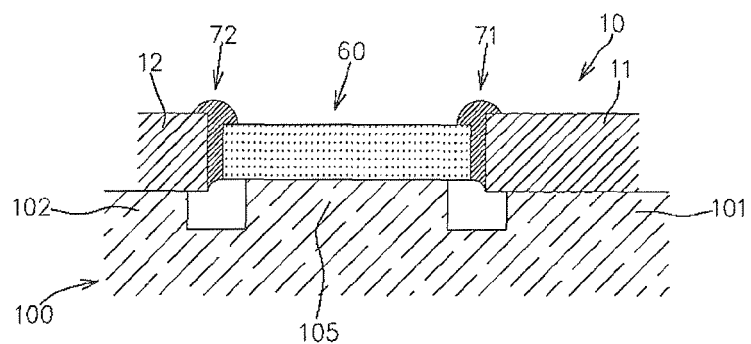

The adhesive agents 70 move downward within the distal-side gap and the proximal-side gap, and are kept in the gaps by surface tension so as to fill them (see FIG. 4D).

Subsequently, the adhesive agents 70 are cured so that the piezoelectric elements 60 are fixed to the supporting part 10 in a predetermined posture.

More specifically, the insulative adhesive agent 70 that has been filled in the distal-side gap and then cured forms the distal-side insulative adhesive agent 72, and the insulative adhesive agent 70 that has been filled in the proximal-side gap and then cured forms the proximal-side insulative adhesive agent 71.

The cure process of the adhesive agent 70 is performed, for example, by heating the supporting part 10 with the piezoelectric elements 60 with heating machine after the piezoelectric elements 60 have been tentatively retained due to surface hardening of the adhesive agent 70 by irradiating the adhesive agent 70 with UV wave or heated air in the state shown in FIG. 4D.

The cure process of the adhesive agent 70 with using the heating machine may be performed in a state where the supporting part 10 with the piezoelectric elements 60 being tentatively retained is removed from the tool 100 and then only the supporting part 10 with the piezoelectric elements 60 is inserted in the heating machine, or in a state where the supporting part 10 with the piezoelectric elements 60 being tentatively retained is inserted in the heating machine along with the tool 100.

As shown in FIGS. 1A and 1B, in the present embodiment, the paired piezoelectric elements 60 are disposed such that the respective longitudinal directions (in other words, the expansion and contraction directions) are aligned along the suspension longitudinal direction. However, the present invention is not limited to such a configuration.

More specifically, the longitudinal directions of the paired piezoelectric elements 60 may be inclined with respect to the suspension longitudinal direction as long as the paired piezoelectric elements 60 are disposed symmetrically with each other with respect to the suspension longitudinal center line CL and each of the longitudinal directions of the paired piezoelectric elements 60 has an element along the suspension longitudinal direction.

Figure 5A:
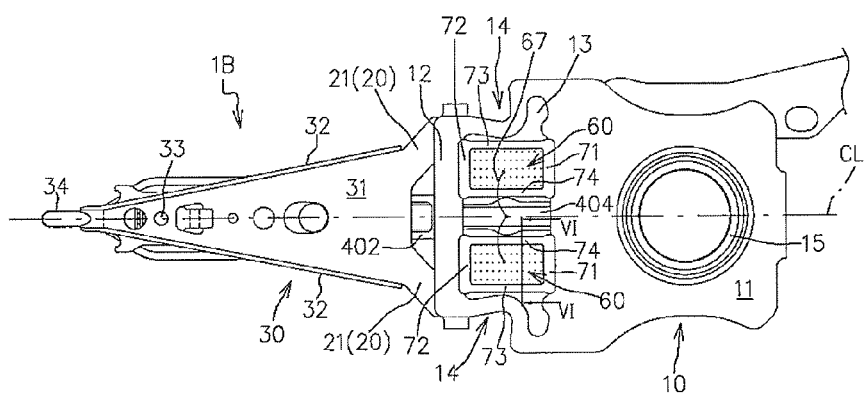
FIGS. 5A and 5B are a top view and a bottom view of a magnetic head suspension according to a modification of the first embodiment, respectively.
Figure 5B:
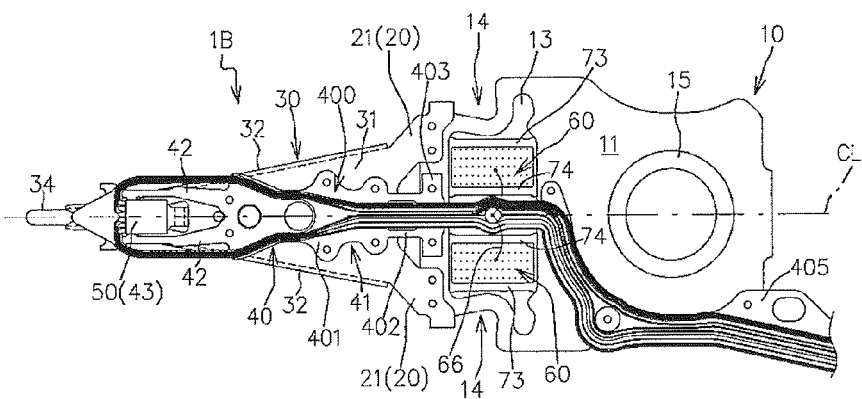

FIGS. 5A and 5B are a top view and a bottom view of a magnetic head suspension according to a modification of the present embodiment, respectively. FIG. 5B indicates welding points with using small circles.

Figure 6:
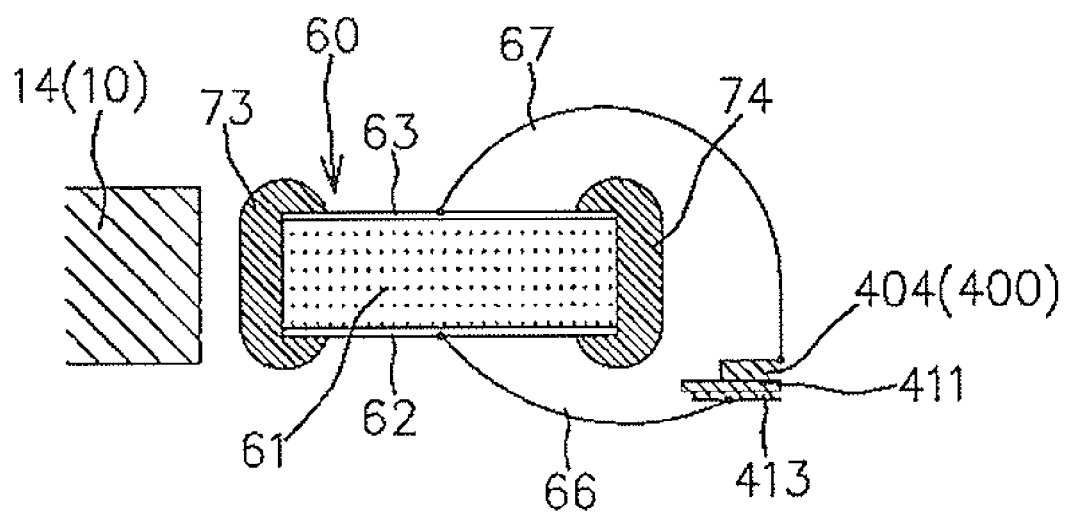
FIG. 6 is a cross sectional view taken along line VI-VI in FIG. 5A.

FIG. 6 is a cross sectional view taken along line VI-VI in FIG. 5A.

In the figures, the members same as those in the present embodiment are denoted by the same reference numerals.

As shown in FIGS. 1A and 1B, in the magnetic head suspension 1A, the piezoelectric element 60 has an outer side surface and an inner side surface in the suspension width direction that are exposed outward.

On the other hand, as shown in FIGS. 5A, 5B and 6, in the magnetic head suspension 1B according to the modification, the outer side surface and the inner side surface of the piezoelectric element 60 are covered with an outer-side insulative adhesive agent 73 and an inner-side insulative adhesive agent 74, respectively.

The configuration makes it possible to effectively prevent spines of the upper and lower electrode layers 63, 60, which may occur at the time when the piezoelectric element 60 is taken out from a wafer, and particles of the piezoelectric main body 61 from dropping at the time when the piezoelectric elements 60 are expanded and contracted.

Second Embodiment

Hereinafter, another embodiment of the magnetic head suspension according to the present invention will be described, with reference to the attached drawings.

Figure 7A:
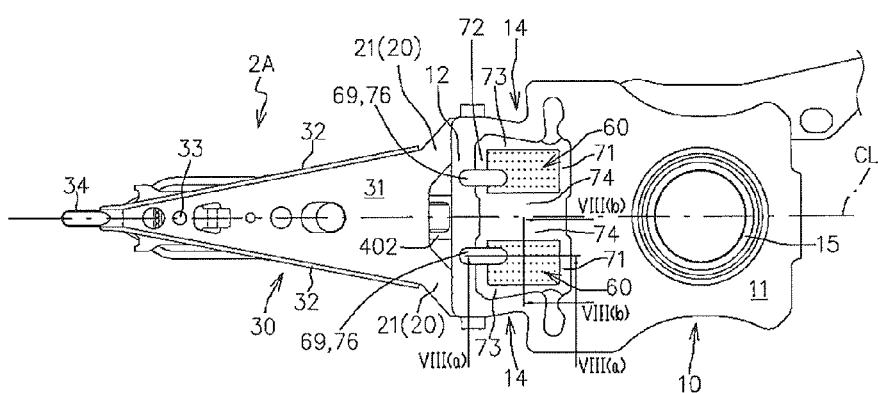
FIGS. 7A and 7B are a top view and a bottom view of a magnetic head suspension according to a second embodiment of the present invention.
Figure 7B:
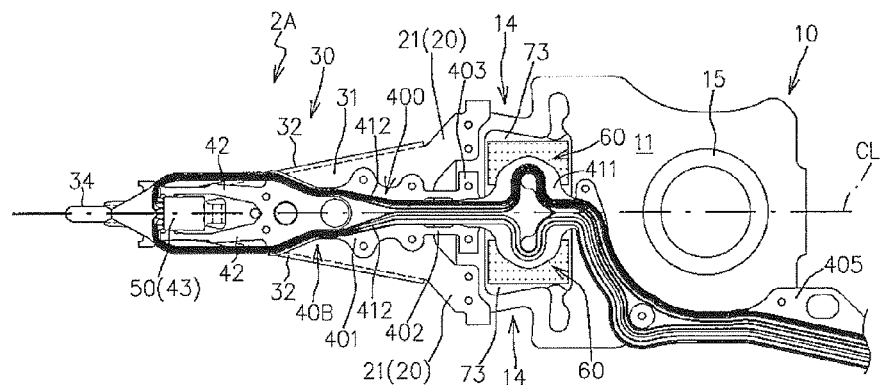

FIGS. 7A and 7B are a top view and a bottom view of a magnetic head suspension 2A according to the present embodiment. FIG. 7B indicates welding points with using small circles.

Figure 8A:
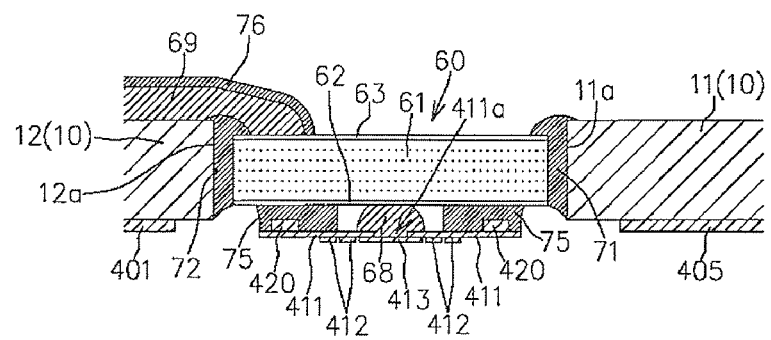
FIGS. 8A and 8B are cross sectional views taken along line VIII(a)-VIII(a) and line VIII(b)-VIII(b) in FIG. 7A, respectively.
Figure 8B:
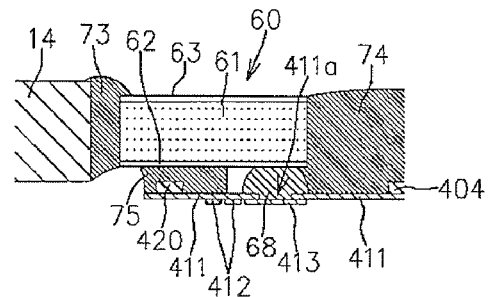

FIGS. 8A and 8B are cross sectional views taken along line VIII(a)-VIII(a) and line VIII(b)-VIII(b) in FIG. 7A, respectively.

In the figures, the members same as those in the first embodiment are denoted by the same reference numerals to omit the detailed description thereof.

Figure 9A:
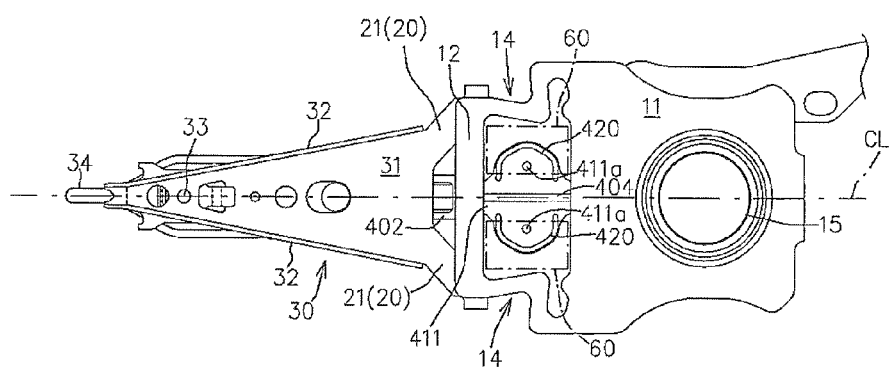
FIG. 9A is a top view of the magnetic head suspension according to the second embodiment in a state where paired piezoelectric elements and insulative adhesive agents are removed therefrom.
Figure 9B:
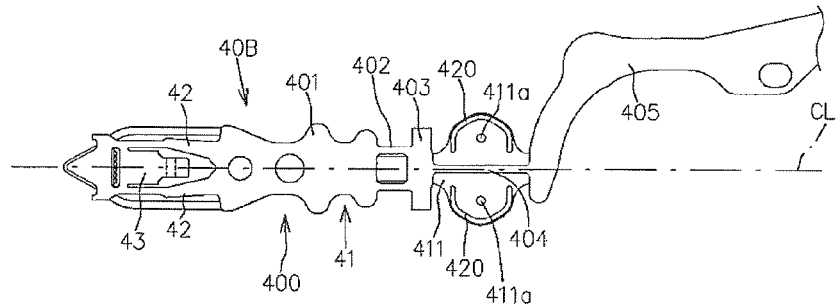
FIG. 9B is a top view of a flexure part of the magnetic head suspension according to the second embodiment.

Furthermore, FIG. 9A is a top view of the magnetic head suspension 2A in a state where the paired piezoelectric elements 60 and the insulative adhesive agents 70 are removed therefrom, and FIG. 9B is a top view of a flexure part 40B of the magnetic head suspension 2A. FIG. 9A shows the paired piezoelectric elements 60 with a dashed line.

As shown in FIGS. 8A, 8B, 9A and 9B, the magnetic head suspension 2A is configured so that the flexure part 40B supports the paired piezoelectric elements 60, thereby stabilizing positions of the paired piezoelectric elements 60 in the z direction (positions in a direction orthogonal to the disk surface) with respect to the supporting part 10.

More specifically, as shown in FIGS. 9A and 9B, the flexure part 40B includes the flexure metal base plate 400, the insulating layer 411, the conductor layer 412 and the cover layer, and also includes paired right and left reinforcing metal plates 420 formed by a metal member same as a metal member forming the flexure metal plate 400.

As shown in FIGS. 9A and 9B, the reinforcing metal plates 420 are separate from the flexure metal plate 400, are disposed on a side of the insulating layer 411 that is opposite from the disk surface so that at least parts thereof face the respective lower electrode layers 62 of the paired piezoelectric elements 60, and are capable of being elastically deformed in the expansion and contraction direction of the paired piezoelectric elements 60.

As shown in FIGS. 8A and 8B, the paired piezoelectric elements 60 are supported by the flexure part 40B through reinforcing insulative adhesive agents 75 applied to the side of the insulating layer 411 that is opposite from the disk surface so as to cover the paired reinforcing metal plates 420, respectively.

The configuration makes it possible to stably mount the paired piezoelectric elements 60 to the supporting part 10 without using the tool 100.

More specifically, it is possible to stably mount the paired piezoelectric elements 60 to the supporting part 10 without using the tool 100 by a method including a step of fixing the flexure metal base plate 400 of the flexure part 40B to the load beam part 30 and the supporting part 10 by welding, a step of applying the reinforcing insulative adhesive agents 75 on the side of the insulating layer 411 that is opposite from the disk surface so as to enclose the paired reinforcing metal plates 420, and a step of filling the distal-side insulative adhesive agent 72 and the proximal-side insulative adhesive agent 71 in the distal-side gap and the proximal-side gap, respectively.

Since the paired reinforcing metal plates 420 can be elastically deformed along the expansion and contraction direction of the paired piezoelectric elements 60, it is effectively prevented or reduced that the paired piezoelectric elements are deformed in a bending manner in the z direction (the direction orthogonal to the disk surface) due to existence of the paired reinforcing metal plates 420 at the time when the paired piezoelectric elements 60 are expanded and contracted.

As shown in FIGS. 9A and 9B, in the present embodiment, each of the paired reinforcing metal plates 420 is formed into a U-liked shape having a convex portion that faces in one side (the outer side in the illustrated embodiment) in the suspension width direction. However, of course, the present invention is not limited to such a configuration.

Figure 10A:
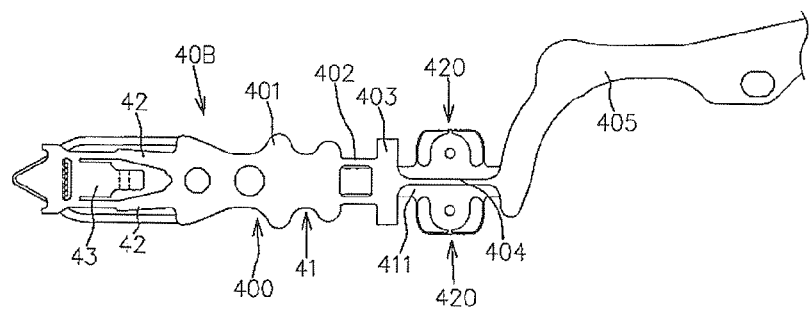
FIGS. 10A and 10B are top views of one modified example and another one modified example of a flexure part of the magnetic head suspension according to the second embodiment, respectively.

For example, as shown in FIG. 10A, each of the paired reinforcing metal plates 420 may be formed into a U-like shape having a convex portion that faces in one side (for example, the outer side) in the suspension width direction, and be divided at the convex portion into a distal side and a proximal side in the suspension longitudinal direction.

Figure 10B:
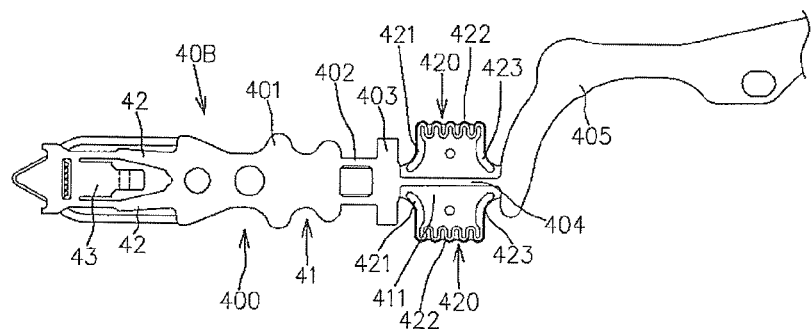

Alternatively, as shown in FIG. 10B, each of the paired reinforcing metal plates 420 may include a distal arm that is positioned on the distal side in the suspension longitudinal direction and extends in the suspension width direction, a proximal arm that is positioned on the proximal side in the suspension longitudinal direction and extends in the suspension width direction, and a longitudinal aim that extends in the suspension longitudinal direction so as to connect the distal arm 421 and the proximal arm 422, wherein the longitudinal arm 422 is formed into an accordion shape in a plan view.

In a configuration where the flexure part 40B is provided with the reinforcing metal plate 420, the flexure part 40B may be preferably provided with the proximal-side bridge region 404, as shown in FIGS. 9A, 9B, 10A and 10B. The preferable configuration can increase rigidity of the flexure part 40B, thereby facilitating a mounting process of the piezoelectric elements 60.

Further, in the present embodiment, the upper electrode layer 63 of each of the paired piezoelectric elements 60 is electrically connected to the supporting part 10 through an upper conductive adhesive agent 69, and the upper conductive adhesive agent 69 is enclosed by an upper insulative adhesive agent 76, as shown in FIGS. 7A, 7B and 8A.

The configuration in which the upper conductive adhesive agent 69 is enclosed by the upper insulative adhesive agent 76 makes it possible to effectively prevent fillers, which are included in the upper conductive adhesive agent 69, from falling onto the disk surface.

Plastic molding agent can be used in place of the upper insulative adhesive agent 76.

The lower electrode layer 62 is electrically connected to the voltage supply line 413 provided in the flexure part 40B through a lower conductive adhesive agent 68, as shown in FIGS. 8A and 8B.

More specifically, the flexure part 40B is provided with the voltage supply line 413 on the side of the insulating layer 411 that faces the disk surface in such a manner as that at least part of the voltage supply line 413 is overlapped with the piezoelectric element 60 in a plan view.

As shown in FIGS. 8A, 8B, 9A and 9B, the insulating layer 411 is formed with an opening 411a for causing a portion of the voltage supply line 413 that is overlapped with the piezoelectric element 60 to be exposed outward. The voltage supply line 413 is electrically connected to the lower electrode layer 62 by the lower conductive adhesive agent 68 through the opening 411a, as shown in FIGS. 8A and 8B.

As shown in FIGS. 8A and 8B, the lower conductive adhesive agent 68 is accommodated in a sealed space enclosed by the lower electrode layer 62 of the piezoelectric element 60, the reinforcing insulative adhesive agent 75, the insulating layer 411 and the inner-side insulative adhesive agent 74, thereby effectively preventing fillers included in lower conductive adhesive agent 68 from falling onto the disk surface.

In the present embodiment, the reinforcing metal plate 420 has a U-like shape in which the outer side in the suspension width direction is become convex and the inner side in the suspension width direction is opened.

In the configuration, the opening 411a is positioned between distal and proximal ends of the corresponding reinforcing metal plate 420 with respect to the suspension longitudinal direction, and is positioned on an inward side of the corresponding reinforcing metal plate 420 (on a side closer to the suspension longitudinal center line CL than the corresponding reinforcing metal plate 420) with respect to the suspension width direction, as shown in FIGS. 9A and 9B.

The lower conductive adhesive agent 68 that electrically connects the voltage supply line 413 with the lower electrode layer 62 through the opening 411a is enclosed by the reinforcing insulative adhesive agent 75 and the inner-side insulative adhesive agent 74, the former agent 75 being provided on a side of the insulating layer 411 that is opposite from the disk surface so as to enclose the corresponding reinforcing metal plate 420, and the later agent 74 being provided so as to cover the inner side of the corresponding piezoelectric element 60 in the suspension width direction.

In the present embodiment, as shown in FIG. 7A, the inner-side insulative adhesive agent 74 is provided to fill whole of a central gap between the paired piezoelectric elements 60 in the suspension width direction.

In a preferable configuration, the outer-side insulative adhesive agent 73 covering the outer side surface of the piezoelectric element 60 is filled in an outer gap between the piezoelectric element 60 and the connecting beam 14 in the suspension width direction in such a manner as that the adhesive agent 73 is fixed to at least a part of the inner side surface of the corresponding connecting beam 14.

In the present embodiment, as shown in FIGS. 7A and 7B, the outer-side insulative adhesive agent 73 is fixed to an inner side surface of the distal-side beam 142.

More specifically, out of the outer gap, a region other than an inner side of the proximal-side beam 141 is filled with the outer-side insulative adhesive agent 73.

As described above, in the present embodiment, the distal-side wall surface of the piezoelectric element 60 and the distal end section 12 are connected to each other by the distal-side insulative adhesive agent 72, and the proximal-side wall surface of the piezoelectric element 60 and the proximal end section 11 are connected to each other by the proximal-side insulative adhesive agent 71. Further, the piezoelectric element 60 and the corresponding connecting beam 41 are connected to each other by the outer-side insulative adhesive agent 73, and the paired piezoelectric elements 60 are connected to each other by the inner-side insulative adhesive agent 74. The configuration makes it possible to increase rigidity of the supporting part 10 to which the paired piezoelectric elements 60 are mounted (rigidity of the supporting part 10 with respect to twisting movement and bending movement), thereby raising the resonance frequency of the magnetic head suspension as a whole as well as improving the impact resistance of the magnetic head suspension (reducing stress that is applied to the piezoelectric elements 60 upon reception of an impact force in the thickness direction).

Figure 11A:
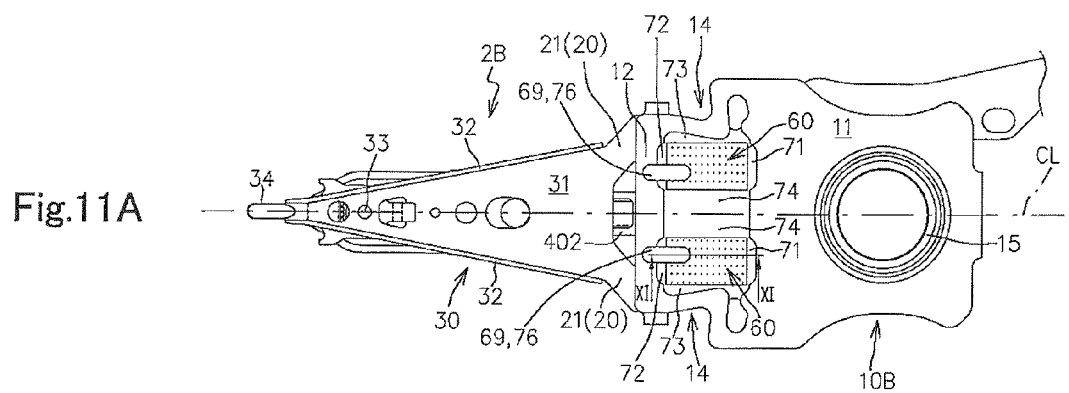
FIG. 11A is a top view of a magnetic head suspension according to a first modification of the second embodiment.
Figure 11B:
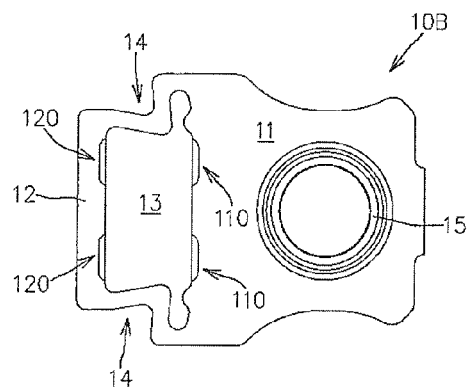
FIG. 11B is a top view of a supporting part of the magnetic head suspension shown in FIG. 11A.
Figure 11C:
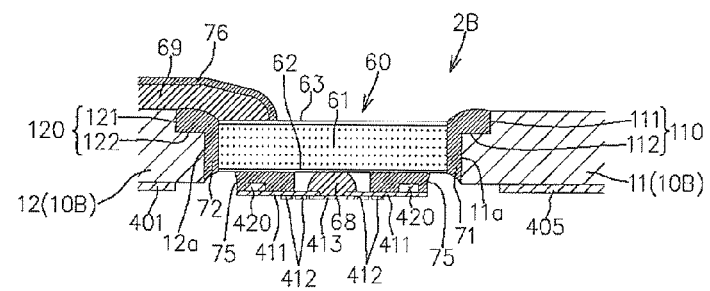
FIG. 11C is a cross sectional view taken along line XI-XI in FIG. 11A.

FIG. 11A is a top view of a magnetic head suspension 2B according to a first modification of the present embodiment, FIG. 11B is a top view of a supporting part 10B of the magnetic head suspension 2B, and FIG. 11C is a cross sectional view taken along line XI-XI in FIG. 11A.

In the figures, the members same as those in the present embodiment and the first embodiment are denoted by the same reference numerals.

As shown in FIGS. 11A to 11C, in the supporting part 10B of the magnetic head suspension 2B according to the first modification, the distal end section 12 is provided with paired distal-side pocket portions 120 at areas thereof that correspond to the paired piezoelectric elements 60 with respect to the suspension width direction. Each of the paired distal-side pocket portions 120 is defined by a vertical surface 121 and a horizontal surface 122, the vertical surface 121 being extended from a surface of the distal end section 12 that is positioned on a first side in a suspension thickness direction toward a second side that is opposite from the first side by a predetermined distance, and the horizontal surface 122 being extended from an end of the vertical surface that is positioned on the second side in the thickness direction to the distal-side wall surface 12a.

Similarly, the proximal end section 11 is provided with paired proximal-side pocket portions 110 at areas thereof that correspond to the paired piezoelectric elements 60 with respect to the suspension width direction. Each of the paired proximal-side pocket portions 110 is defined by a vertical surface 111 and a horizontal surface 112, the vertical surface 111 being extended from a surface of the proximal end section 11 that is positioned on the first side in the suspension thickness direction toward the second side that is opposite from the first side by a predetermined distance, and the horizontal surface 112 being extended from an end of the vertical surface 111 that is positioned on the second side in the thickness direction to the proximal-side wall surface 11a.

The first modification 2B with the configuration makes it possible to smoothly inpour the distal-side insulative adhesive agent 72 through the paired distal-side pocket portions 120 into the distal-side gaps, and also smoothly inpour the proximal-side insulative adhesive agent 71 through the paired proximal-side pocket portions 110 into the proximal-side gaps.

Accordingly, it is possible to enhance workability of filling process of the distal-side insulative adhesive agent 72 and the proximal-side insulative adhesive agent 71.

Figure 12:
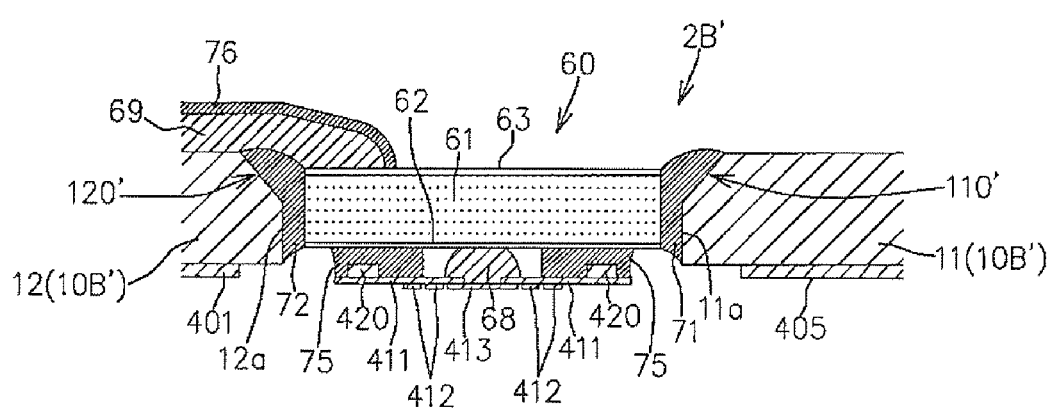
FIG. 12 is a partial vertical cross sectional side view of a magnetic head suspension according to a second modification of the second embodiment, and corresponds to FIG. 11C.

FIG. 12 is a partial vertical cross sectional side view of a magnetic head suspension 2B' according to a second modification, and corresponds to FIG. 11C.

In the figure, the members same as those in the present embodiment including the first modification and the first embodiment are denoted by the same reference numerals.

As shown in FIG. 12, in a supporting part 10B' of the magnetic head suspension 2B' according to the second modification, the distal end section 12 is provided with paired distal-side pocket portions 120' at areas thereof that correspond to the paired piezoelectric elements 60 with respect to the suspension width direction. Each of the paired distal-side pocket portions 120' is defined by a tapered surface extending from the surface of the distal end section 12 that is positioned on the first side in the suspension thickness direction to the distal-side wall surface 12a, the tapered surface being come close to the distal-side wall surface 12a as it goes from the surface on the first side in the thickness direction toward the second side and reaching the distal-side wall surface 12a at a position away from the surface on the first side toward the second side in the thickness direction by a predetermined length.

The proximal end section 11 is provided with paired proximal-side pocket portions 110' at areas thereof that correspond to the paired piezoelectric elements 60 with respect to the suspension width direction. Each of the paired proximal-side pocket portions 110' is defined by a tapered surface extending from the surface of the proximal end section 11 that is positioned on the first side in the suspension thickness direction to the distal-side wall surface 12a, the tapered surface being come close to the proximal-side wall surface 11a as it goes from the surface on the first side in the thickness direction toward the second side and reaching the proximal-side wall surface 11a at a position away from the surface on the first side toward the second side in the thickness direction by a predetermined length.

The second modification with the configuration can realize the same effect as the first modification.

The first and second modifications has been explained with taking as an example a case in which the paired distal-side pocket portions 120(120') and the paired proximal-side pocket portions 110(110') are provided in the magnetic head suspension 2A according to the present embodiment. However, it is of course possible that the paired distal-side pocket portions 120(120') and the paired proximal-side pocket portions 110(110') are provided in the magnetic head suspension 1A according to the first embodiment.

Third Embodiment

Hereinafter, still another embodiment of the magnetic head suspension according to the present invention will be described, with reference to the attached drawings.

Figure 13:
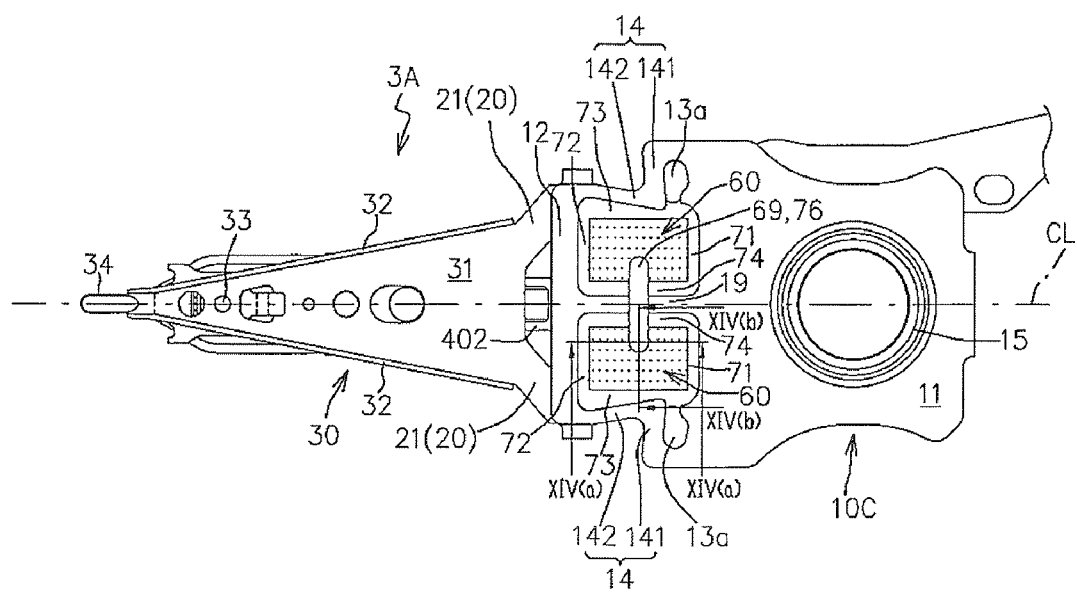
FIG. 13 is a top view of a magnetic head suspension according to a third embodiment of the present invention.

FIG. 13 is a top view of a magnetic head suspension 3A according to the present embodiment.

Figure 14A:
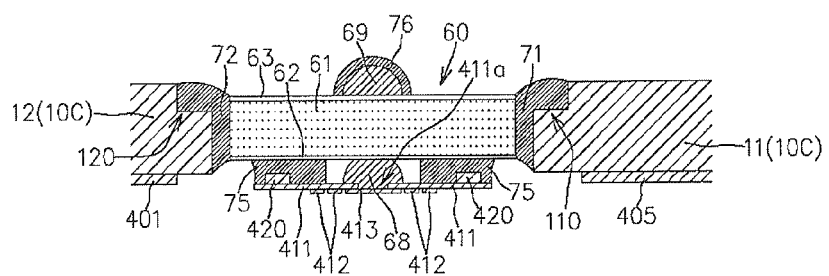
FIGS. 14A and 14B are cross sectional views taken along line XIV(a)-VIV(a) and line XIV(b)-XIV(b) in FIG. 13, respectively.
Figure 14B:
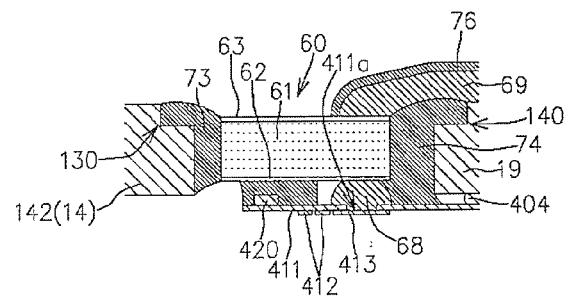

FIGS. 14A and 14B are cross sectional views taken along line XIV(a)-VIV(a) and line XIV(b)-XIV(b) in FIG. 13, respectively.

In the figures, the members same as those in the first and second embodiments are denoted by the same reference numerals to omit the detailed description thereof.

As shown in FIGS. 13, 14A and 14B, the magnetic head suspension 3A according to the present embodiment is different from the magnetic head suspension 2A mainly in that the supporting part 10 is replaced with a supporting part 10C.

Figure 15:
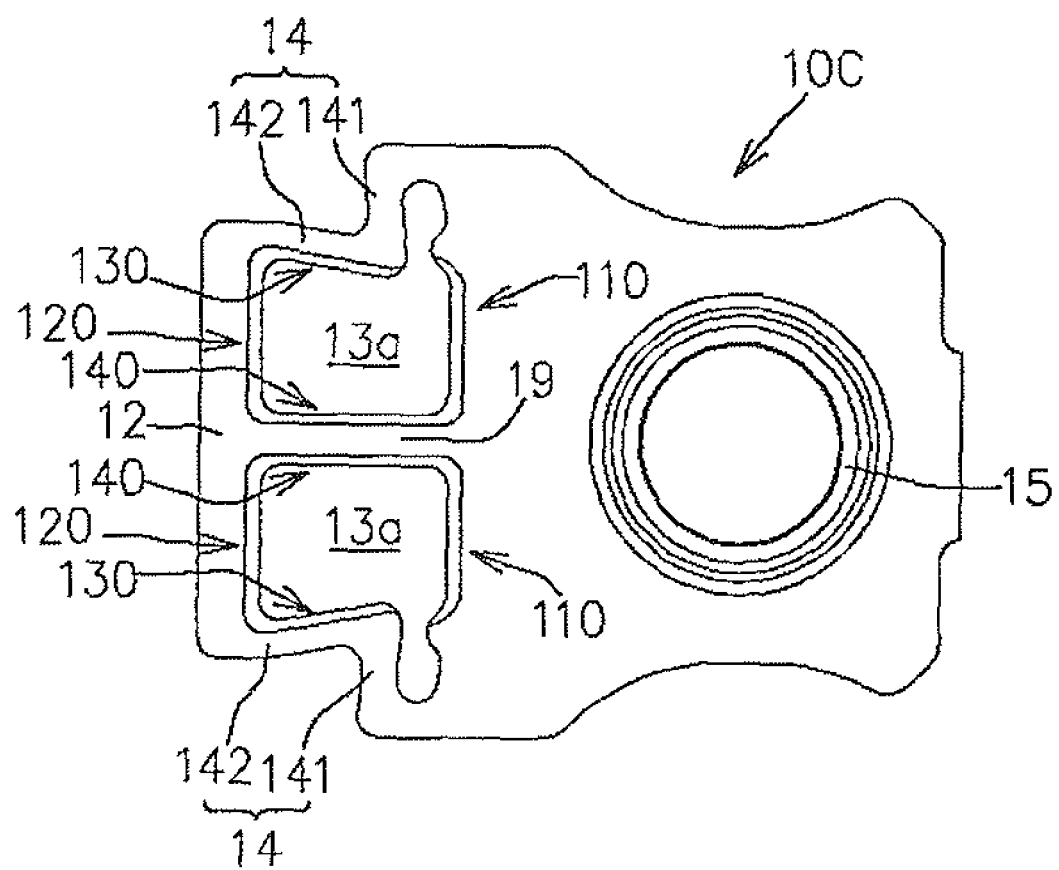
FIG. 15 is a top view of a supporting part 10C of the magnetic head suspension according to the third embodiment.

FIG. 15 is a top view of the supporting part 10C.

As shown in FIGS. 13 and 15, the supporting part 10C includes the components of the supporting parts 10, 10B, and also includes a central connecting beam 19 that is positioned on the suspension longitudinal center line CL and connects the distal end section 12 and the proximal end section 11.

More specifically, in the supporting part 10C in the present embodiment, the open section 13 is divided into paired right and left open sections 13a by the central connecting beam 19.

The magnetic head suspension 3A with the supporting part 10C including the paired connecting beams 14 and the central connecting beam 19 that is positioned on a center in the suspension width direction and connects the distal end section 12 and the proximal end section 11 makes it possible to increase rigidity of the supporting part 10C (rigidity of the supporting part 10 with respect to twisting movement and bending movement) without worsening movability of the magnetic head slider 50 in the seek direction by the paired piezoelectric elements 60, thereby raising the resonance frequency of the magnetic head suspension 3A as a whole as well as improving the impact resistance of the magnetic head suspension 3A (reducing stress that is applied to the piezoelectric elements 60 upon reception of an impact force in the thickness direction).

In the present embodiment, the supporting part 10C is formed with inner-side pocket portions 140 for enhancing workability of filling process of the inner-side insulative adhesive agents 74 and outer-side pocket portions for enhancing workability of filling process of the outer-side insulative adhesive agent 73 in addition to the distal-side pocket portions 110 and the proximal-side pocket portions 120, as shown in FIG. 15.

The inner-side pocket portions 140 are formed at both sides of the central connecting beam 19 in the suspension width direction.

The outer-side pocket portions 130 are formed at inner sides of the connecting beams 14 in the suspension width direction.

In the present embodiment, the outer-side pocket portion 130 is formed at an inner side of the distal-side beam 142 in the suspension width direction so as to be across the substantially full length of the distal-side beam 142 in the suspension longitudinal direction.

In the present embodiment, as shown in FIGS. 14A and 14b, each of the distal-side pocket portions 120, the proximal-side pocket portions 110, the inner-side pocket portions 140 and the outer-side pocket portions 130 is formed so as to have a step-like shape defined by a vertical surface and a horizontal surface, in the same manner as the configuration shown in FIGS. 11A to 11C. Alternatively, any one of the pocket portions may be formed so as to have a tapered shape, as in the configuration shown in FIG. 12.

Furthermore, in the present embodiment, as shown in FIG. 14B, the upper conductive adhesive agent 69 is configured so as to electrically connect the upper electrode layer 63 to the central connecting beam 19.

Preferably, as shown in FIGS. 13 and 14, the upper conductive adhesive agent 69 may be configured so as to extend in both sides of the central connecting beam 19 in the suspension width direction in a state of being electrically connected to the central connecting beam 19, and have a first end electrically connected to the upper electrode layer 63 of one of the paired piezoelectric elements 60 and a second end electrically connected to the upper electrode layer 63 of the other one of the paired piezoelectric elements 60.

The preferable configuration makes it possible to simplify ground connection of the upper electrode layers 63 of the paired piezoelectric elements 60.

What is claimed is:

1. A magnetic head suspension comprising a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each other with respect to a suspension longitudinal center line and have expansion and contraction directions different from each other in order to enable micro motion of the magnetic head slider in a seek direction, each of the paired piezoelectric elements including a piezoelectric main body, a lower electrode layer that is disposed on a first side of the piezoelectric main body that faces the disk surface and an upper electrode layer that is disposed on a second side of the piezoelectric main body that is opposite from the disk surface, wherein the supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned on both sides of the open section in a suspension width direction and connect the proximal end section and the distal end section, wherein each of the paired piezoelectric elements is disposed within the open section so that at least a part of a distal-side end surface of each of the paired piezoelectric elements faces a distal-side wall surface of the distal end section of the supporting part that faces toward the proximal side in the suspension longitudinal direction forming a distal-side gap between the distal-side end surface and the distal-side wall surface and at least a part of a proximal-side end surface of each of the paired piezoelectric elements faces a proximal-side wall surface of the proximal end section of the supporting part that faces toward the distal side in the suspension longitudinal direction forming a proximal-side gap between the proximal-side end surface and the proximal-side wall surface in a state where both of the upper and lower electrode layers do not face the supporting part and any rigid members that are fixed to the supporting part, and wherein each of the paired piezoelectric elements is fixed to the supporting part by a distal-side insulative adhesive agent and a proximal-side insulative adhesive agent that fill the distal-side gap and the proximal-side gap, respectively.

2. A magnetic head suspension according to claim 1, wherein each of the paired piezoelectric elements has an inner side surface and an outer side surface that are covered by an inner-side insulative adhesive agent and an outer-side insulative adhesive agent, respectively.

3. A magnetic head suspension according to claim 2, wherein each of the paired connecting beams includes a proximal-side beam that extends substantially linearly from a proximal end connected to the proximal end section to a distal end, and a distal-side beam that extends substantially linearly from a proximal end connected to the proximal-side beam to a distal end connected to the distal end section, wherein the distal-side beam is inclined with respect to the proximal-side beam in a plan view as viewed along a direction orthogonal to the disk surface such that a connection point at which the proximal-side beam and the distal-side beam are connected is located closer to the suspension longitudinal center line relative to a virtual line connecting the proximal end of the proximal-side beam and the distal end of the distal-side beam, wherein the outer-side insulative adhesive agent is fixed to at least a part of the corresponding connecting beam, and wherein the inner-side insulative adhesive agent is provided so as to fill a central gap between the paired piezoelectric elements in the suspension width direction.

4. A magnetic head suspension according to claim 1, wherein the flexure part includes a flexure metal base plate fixed to the load beam part and the supporting part by welding, paired right and left reinforcing metal plates that are separate from the flexure metal base plate, an insulating layer laminated on surfaces of the flexure metal base plate and the paired reinforcing metal plates that face the disk surface so as to hold the flexure metal base plate and the paired reinforcing metal plates, and a conductor layer laminated on a surface of the insulating layer that faces the disk surface, each of the paired reinforcing metal plates being disposed so as to at least partially face the lower electrode layer of the corresponding piezoelectric element and be capable of being elastically deformed in the expansion and contraction direction of the piezoelectric element, and wherein the paired piezoelectric elements are supported by the flexure part through reinforcing insulative adhesive agents applied to the surface of the insulating layer that is opposite from the disk surface so as to enclose the paired reinforcing metal plates, respectively.

5. A magnetic head suspension according to claim 4, wherein the flexure part further includes a voltage supply line on the surface of the insulating layer that faces the disk surface, wherein the voltage supply line is electrically connected to the lower electrode layer by a lower conductive adhesive agent through an opening formed at the insulating layer, wherein there is provided an enclosing insulative adhesive agent that encloses the lower conductive adhesive agent in cooperation with the reinforcing insulative adhesive agent, and wherein the lower conductive adhesive agent is accommodated in a sealed space enclosed by the lower electrode layer, the insulating layer, the reinforcing insulative adhesive agent and the enclosing insulative adhesive agent.

6. A magnetic head suspension according to claim 1, wherein the distal end section is provided with paired distal-side pocket portions at areas thereof that correspond to the paired piezoelectric elements with respect to the suspension width direction, each of the paired distal-side pocket portions being defined by a vertical surface and a horizontal surface, the vertical surface being extended from a surface of the distal end section that is positioned on a first side in a suspension thickness direction toward a second side that is opposite from the first side by a predetermined distance, and the horizontal surface being extended from an end of the vertical surface that is positioned on the second side in the thickness direction to the distal-side wall surface, and wherein the proximal end section is provided with paired proximal-side pocket portions at areas thereof that correspond to the paired piezoelectric elements with respect to the suspension width direction, each of the paired proximal-side pocket portions being defined by a vertical surface and a horizontal surface, the vertical surface being extended from a surface of the proximal end section that is positioned on the first side in the suspension thickness direction toward the second side by a predetermined distance, and the horizontal surface being extended from an end of the vertical surface that is positioned on the second side in the thickness direction to the proximal-side wall surface.

7. A magnetic head suspension according to claim 1, wherein the distal end section is provided with paired distal-side pocket portions at areas thereof that correspond to the paired piezoelectric elements with respect to the suspension width direction, each of the paired distal-side pocket portions being defined by a tapered surface extending from the surface of the distal end section that is positioned on a first side in a suspension thickness direction to the distal-side wall surface, the tapered surface comes closer to the distal-side wall surface as it goes from the surface on the first side in the thickness direction toward a second side that is opposite from the first side, and reaching the distal-side wall surface at a position away from the surface on the first side toward the second side by a predetermined length, and wherein the proximal end section is provided with paired proximal-side pocket portions at areas thereof that correspond to the paired piezoelectric elements with respect to the suspension width direction, each of the paired proximal-side pocket portions being defined by a tapered surface extending from a surface of the proximal end section that is positioned on the first side in the suspension thickness direction to the distal-side wall surface, the tapered surface comes closer to the proximal-side wall surface as it goes from the surface on the first side toward the second side, and reaching the proximal-side wall surface at a position away from the surface on the first side toward the second side by a predetermined length.

\* \* \* \* \*